July 29, 1952  R. W. BROWN  2,605,099
RUBBER-METAL SPRING
Filed Jan. 7, 1949  2 SHEETS—SHEET 2

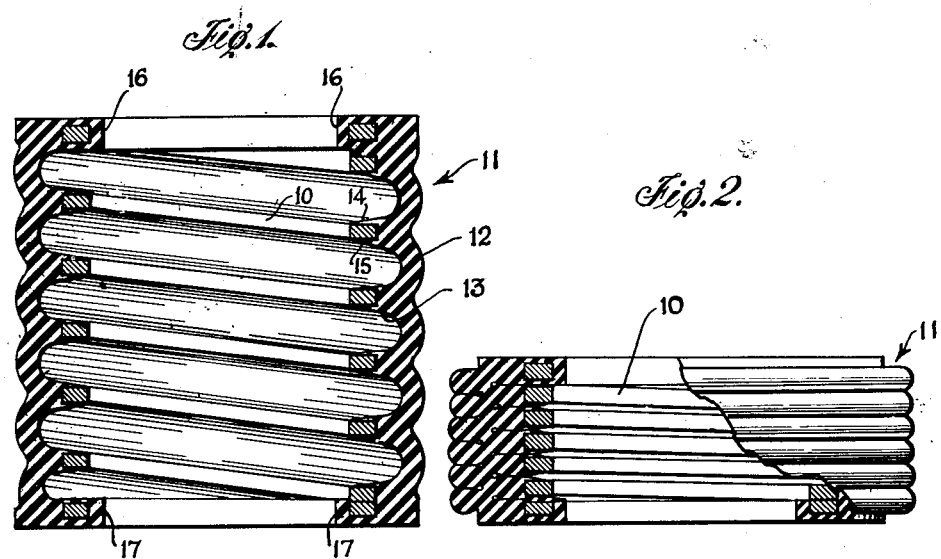
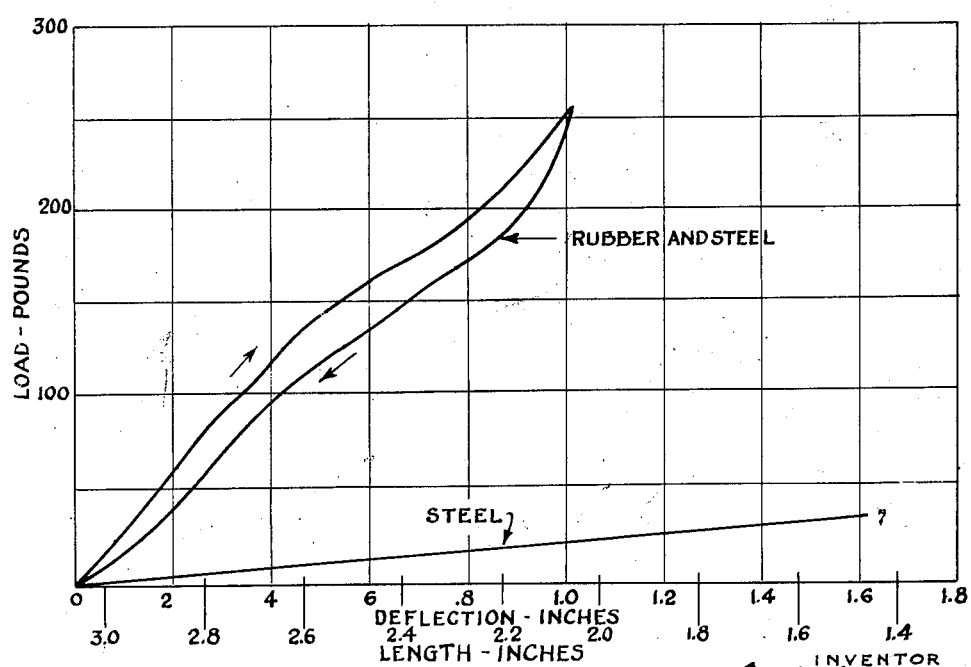

INVENTOR.
Roy W. Brown
BY
Ely & Frye
ATTORNEYS

Patented July 29, 1952

2,605,099

UNITED STATES PATENT OFFICE 2,605,099

RUBBER-METAL SPRING

Roy W. Brown, Akron, Ohio, assignor to The Firestone Tire & Rubber Company, Akron, Ohio, a corporation of Ohio Application January 7, 1949, Serial No. 69,709

10 Claims. (Cl. 267—33)

This invention relates to a composite spring wherein a metal helical spring forms a skeleton for an outer bellows-like envelope of rubber-like material.

The shortcomings of all-steel springs, as employed for instance in various types of vehicle suspensions, are pointed out in my United States Patent No. 2,445,723. Steel springs are inadequate to carry sudden and severe compression loads, are subject to buckling under column loading, must have a considerable length to approach satisfactory performance under extreme expected conditions, and have a weight that is prohibitive. The disclosure of my aforesaid patent is directed to a spring in which the resilient element is comprised entirely of rubber. While such an arrangement effectively solves most of the problems of compressional stresses it does not provide for absorbing the shock of recoil. Also, since it depends almost entirely on volume compression of rubber, a large quantity of rubber is required and provision must be made to dissipate heat representing hysteresis losses.

I have found that by providing a relatively thin envelope of rubber interconnected with an inner metal helix, most of the drawbacks of prior art springs are eliminated, cost is reduced, and an improved mode of functioning is attained, all with further attendant benefits present to a degree in greater proportion than in the case of either component functioning alone.

It is therefore an object of the invention to provide a new type of spring having improved performance under cyclic loading.

More particularly, it is an object to provide a combination spring having advantages over and above those of rubber and metal springs taken separately, and the parts of which combination spring coact toward elimination by each component of the defects of the other considered in its separate capacity.

Another object is to provide a spring which is "soft" in its median position and "stiff" on either end of its deformation cycle, and especially to provide such a result at a minimized amplitude of oscillation.

Another and more specific object is to provide a spring with increased energy storage capacity coupled with lowered overall weight.

Among other objects is to provide a spring which is dust-proof, low in cost, easy of manufacture and installation, and having an increased length of useful life.

To these and other ends, which will be in part apparent to those skilled in the art and in part made manifest as the description proceeds, the invention is expressible in embodiments, a preferred form of which is described in the accompanying specification and illustrated in the drawings, in which:

Fig. 1 is an axial section of the spring shown in unstressed condition,

Fig. 2 is a view similar to Fig. 1 showing the spring in the fully compressed state, Fig. 3 is a graph illustrating the stress-strain characteristics of the spring of the invention and those of a conventional steel spring.

Figure 4:
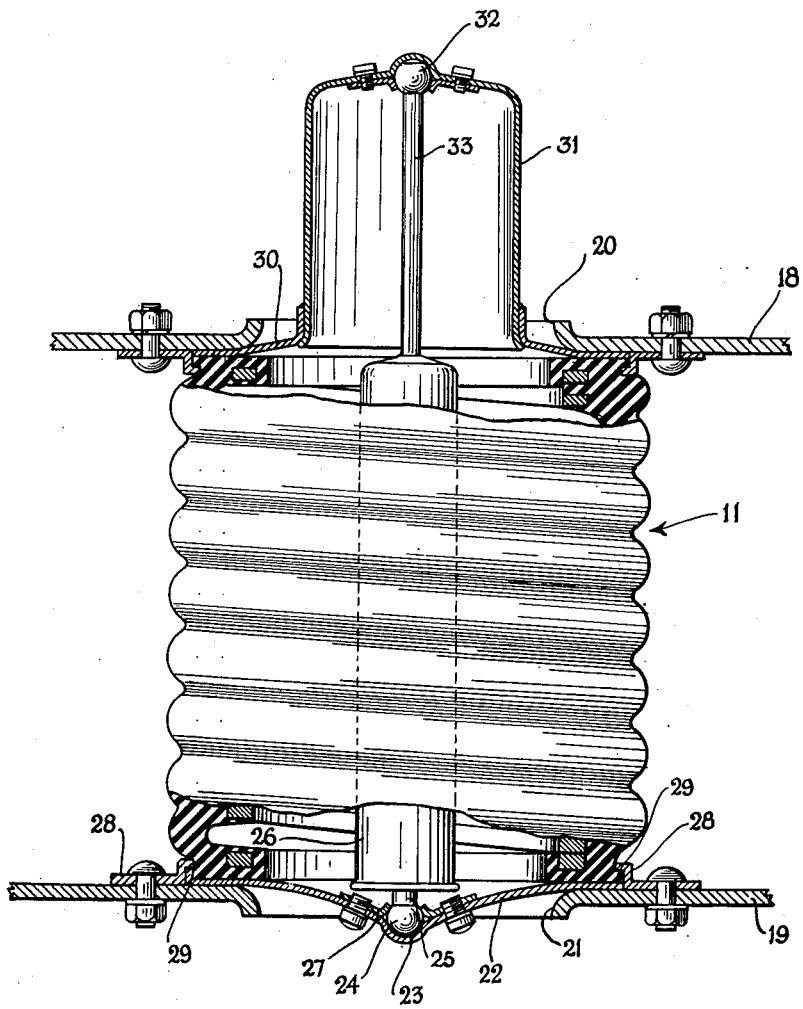
Fig. 4 shows the rubber-steel spring as employed surrounding a shock absorber.

Referring to the drawings by characters of reference, there is shown in Fig. 1 an assembly comprising a helical steel spring 10 of rectangular cross-section. A surrounding envelope 11 of rubber or rubber-like material is formed with an undulatory wall section, the crests 12 of which lie between adjacent convolutions of the steel spring 10 and which, therefore, are also helically arranged. The troughs of the wall section are extended as at 13 to the outer surface of steel spring 10 and envelop the upper and lower sides thereof as at 14, 15, being bonded thereto by any convenient means such as vulcanization in a manner known in the art. This overlapping extension of the rubber need not be of any considerable thickness since it is not significant in the compressing function, its chief purposes being to locate and hold the steel spring in position and to form a connecting link between the steel spring and the thick wall sections of the rubber spring to restrain the steel spring against buckling. These thin, feathered portions 14, 15 are not subject to contacts which would result in deformation and wear except in the extreme case shown in Fig. 2. However, the situation is different at the end convolutions of the spring where the thrust is directly transmitted during service. For this reason it is preferable to cushion the end convolutions and, as shown at 16 on the upper end and 17 on the lower end, the enveloping rubber is of increased thickness and surrounds the steel spring entirely.

The bonding of the rubber portions 14, 15 to the steel spring is greatly improved by the flat surfaces of the latter. In an all-steel spring such a cross-sectional shape is not feasible since it is imperative to have maximum cross-sectional area for a given unit weight of spring. In the composite spring shown the load-carrying requirements of the steel component are of only minor importance.

The action of the composite spring will be apparent from an inspection of Figs. 1 and 2. As the spring is compressed the strain in the rubber is manifest as a compression in the undulations 12 and then a collapse thereof, with the inner walls approaching contact and with the outer side extending progressively, radially of the spring, with adjacent undulations approaching contact. In the condition shown in Fig. 2, all further compression results in pure volume compression of the rubber, whereas in the early stages the stresses consisted of both tension and compression depending, in relative magnitude, upon the configuration of the wall section. This situation is reflected in the upper graph of Fig. 3 wherein the intermediate stages show a "soft" region as compared with "stiff" regions at the beginning and end of the graph. A somewhat similar curve would be obtained if the undulations were turned inwardly, but this arrangement cramps peripheral expansion and would result in fatigue failures.

It will be seen that when the spring is elongated above its normal length when at rest, substantially the reverse takes place. Considered as a whole, the rubber spring in this case is in tension, but in the early stages of extension the straightening of the wall will result in a tension on the inside wall and a compression on the outside wall. If the extension be carried far enough, the compression in the outer wall will diminish and pass into a condition of tension. In either tension or compression as a whole, the spring presents a stiffening at either end of the movement which damps the movement very effectively but without shock. This is to be contrasted with a steel spring which presents no such gradual stiffening action and which reaches maximum movement with a solid resistance and resultant shock.

The steel spring skeleton member contributes in great measure to the lateral stability of the spring as a whole. Steel springs, in themselves, are subject to buckling, and the conventional rubber "air spring" is not only subject to buckling but to various forms of localized deformations. The steel skeleton serves to distribute any loads which might tend to deform the spring laterally and thus defeats localized action of this sort. In other respects the steel spring aids in minimizing the tendency of the rubber to "set" permanently and to overcome the drawbacks of rubber when employed at low temperatures.

The work capacity of the combination spring is highly favorable, as will be immediately apparent from an inspection of the graph of Fig. 3. Considering the weight of the spring the improvement is even more pronounced. At one inch deflection, the combination spring carries 240 pounds and weighs 0.76 pound, or 316 pounds per pound of weight, whereas the steel spring carries 20 pounds and weighs 0.43 pound, or 46.5 pounds per pound of weight. This represents a ratio of 6.8 to 1 in favor of the combination spring. In addition to this, the composite spring can be considerably shorter in length than an all-steel spring.

As a further advantage, the "surge" vibrations incident to steel springs, wherein an impulse travels from end to end until damped, are eliminated in the rubber covered spring. Likewise, noise transmission is eliminated.

With suitable end closures the rubber-steel spring is completely enclosed, which serves to keep out foreign matter and enables air inflation so that the spring may be maintained at constant desired length by altering inflation for varying loads.

Damping, due to hysteresis in the rubber, is sufficiently significant in amount to be beneficial and may even reduce the required capacity in a shock absorber when the latter is employed in conjunction with the spring.

In vehicular mountings it is customary to employ compression and recoil bumpers in conjunction with springs. With the spring of this invention and its inherent features of cushioning at the extremities of its stroke, such extra devices become unnecessary.

The feature of keeping out foreign matter is of especial merit where the spring is used to surround a shock absorber as shown in Fig. 4. The accumulation of foreign matter on the piston rod of a shock absorber is an acute problem, resulting in wear and leakage, and no satisfactory solution has heretofore been advanced.

Referring to Fig. 4, the spring of the invention is shown in association with a conventional shock absorber. The assembly is contained between relatively movable portions of a vehicle structure indicated at 18 and 19 having openings 20 and 21, respectively, to accommodate extended portions of the spring unit. For attachment purposes, the spring unit has metallic members on top and bottom. The lower member 22 has a dished form with a central socket 23 of small curvature to accommodate a ball 24 on a rod 25 extending from the cylinder 26 of the shock absorber. The ball 24 is held in place by a dished clamp washer 27. The member 22 is bonded to the rubber of the spring, and the spring is secured in place on the structure 19 by means of bolted clamps 28. Preferably a shoulder of rubber 29 is interposed beneath the clamp to reduce vibration and eliminate noise. The upper end of the spring is fixed to the structure 18 in a similar manner, plate 30 being bonded to the rubber. A dome 31 is attached to a central opening in the plate 30 and has a socket arrangement similar to that on the lower member 22 to receive a ball 32 on the piston rod 33 of the shock absorber.

In the operation of this assembly, members 18 and 19 approach and recede in the operation of the vehicle. The spring 11 performs in the manner earlier described, and, in addition, the shock absorber is active to prevent excessive shocks and to damp the spring action. It will be seen that the part of the shock absorber most critically affected by dust, dirt and other foreign matter, namely the piston rod 33, is most effectively sealed off from such contamination, thus increasing its useful life. Further, such shielding is effected by a member which performs its own necessary function in addition and is not carried for the purpose of shielding alone.

While a certain embodiment of the invention has been shown, the invention is not to be taken as limited thereby, modification, such as in the precise character, shape and arrangement of the parts, being possible without departing from the spirit or scope of the invention.

What is claimed is:

1. A combination spring comprising an outer envelope of rubber-like material, parallel ribs extending inwardly from the inner wall of the said envelope and defining a helically arranged channel having two flat sides and a flat bottom, and a helical, metal spring of quadrilateral section engaged in said channel.

2. A combination spring comprising an outer envelope of rubber-like material, parallel ribs extending inwardly from the inner wall of the said envelope and defining a helically arranged channel having two flat sides and a flat bottom, and a helical, metal spring of quadrilateral section engaged in said channel in bonded relation to the rubber.

3. A combination spring comprising an outer envelope of rubber-like material having an inner helical rib, and a helical, metal spring of quadrilateral cross-section contained inwardly of the said envelope and at least partially embedded in said rib.

4. A combination spring comprising an outer envelope of rubber-like material having an outer helically disposed channel, an inner, helically disposed rib aligned with said channel, a helical, metal spring of rectangular cross-section engaged on its upper and lower surfaces by said rib, and the material of said envelope completely surrounding the end convolutions of said metal spring.

5. A combination spring comprising an outer envelope of solid, rubber-like material, said envelope having an integral rib extending inwardly from its inner wall and defining, between convolutions of said rib a helically arranged channel, and a helical, metal spring engaged in said rib and extending inwardly therefrom.

6. A combination spring comprising an outer envelope of solid, rubber-like material, said envelope having an integral rib extending inwardly from its inner wall and defining, between convolutions of said rib a helically arranged channel, and a helical, metal spring engaged in said rib in surface-bonded relation therewith and extending inwardly therefrom.

7. A combination spring comprising an inner, helical, metal spring, and an outer envelope of solid, rubber-like material throughout, said envelope having a wall of undulatory cross section when the envelope is in normal, unstressed condition, and with the undulations arranged in the form of a helix, and said spring partially embedded in the undulations and located inwardly of the path of axial collapse of said wall.

8. A combination spring comprising an inner, helical, metal spring, and an outer envelope of solid, rubber-like material throughout, said envelope having a wall of undulatory cross section when the envelope is in normal, unstressed condition, and with the undulations arranged in the form of a helix, said undulations having an inward extension on their parts nearest the axis of the helix, and said spring being embedded in said extension.

9. A combination spring comprising an inner, helical, metal spring and an outer envelope of solid, rubber-like material throughout, said envelope having undulations helically arranged, with a pitch equal to that of the metal spring, and having an inner, helical trough opposite the outer crests of the undulations, said spring being partially embedded in said envelope between said troughs.

10. A combination spring comprising an inner, helical, metal spring and an outer envelope of solid, rubber-like material throughout, said envelope having undulations helically arranged, with a pitch equal to that of the metal spring, and having an inner, helical trough opposite the outer crests of the undulations, and a helically arranged rib protruding inwardly from a line between adjacent convolutions of said trough and at least partially embedding said metal spring.

ROY W. BROWN.

REFERENCES CITED

The following references are of record in the file of this patent:

UNITED STATES PATENTS

| Number | Name | Date |
|---|---|---|
| Re. 6,037 | Vose | Sept. 1, 1874 |
| 84,258 | Bussell | Nov. 24, 1868 |
| 168,846 | Pratt | Oct. 19, 1875 |
| 2,005,089 | Krebs | June 18, 1935 |
| 2,056,106 | Kuhn | Sept. 29, 1936 |
| 2,156,580 | Best | May 2, 1939 |
| 2,192,355 | Kuhn | Mar. 5, 1940 |
| 2,314,505 | McIntyre et al. | Mar. 23, 1943 |

FOREIGN PATENTS

| Number | Country | Date |
|---|---|---|
| 3,698 | Great Britain | Dec. 31, 1900 |
| 497,008 | Great Britain | Dec. 5, 1938 |
| 34,669 | France | Apr. 9, 1929 |